(12) United States Patent
Ching et al.

(10) Patent No.: US 6,581,076 B1
(45) Date of Patent: Jun. 17, 2003

(54) METHOD AND SYSTEM FOR EFFICIENT FILE ARCHIVING AND DEARCHIVING IN A DMD SYSTEM

(75) Inventors: Jennie Ching, Northridge, CA (US); Eric Hsiao, San Marino, CA (US); Peter S. Lee, Calabasas, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/538,563

(22) Filed: Mar. 29, 2000

(51) Int. Cl.[7] .............................................. G06F 17/30
(52) U.S. Cl. ....................... 707/204; 707/10; 707/104.1
(58) Field of Search ............................... 707/10, 104.1, 707/204; 709/328; 711/118, 161; 713/201

(56) References Cited

U.S. PATENT DOCUMENTS

| | | | |
|---|---|---|---|
| 4,724,491 A | 2/1988 | Lambert | 386/1 |
| 5,055,924 A | 10/1991 | Skutta | 725/34 |
| 5,424,770 A | 6/1995 | Schmelzer et al. | 725/36 |
| 5,432,542 A | 7/1995 | Thibadeau et al. | 725/35 |
| 5,450,122 A | 9/1995 | Keene | 725/22 |
| 5,659,351 A | 8/1997 | Huber | 725/101 |
| 5,887,243 A | 3/1999 | Harvey et al. | 725/136 |
| 5,996,025 A * | 11/1999 | Day et al. | 709/328 |
| 6,011,758 A * | 1/2000 | Dockes et al. | 707/104.1 |
| 6,434,680 B2 * | 8/2002 | Belknap et al. | 711/161 |

FOREIGN PATENT DOCUMENTS

WO WO9608923 A1 3/1996 ............ H04N/7/08

* cited by examiner

*Primary Examiner*—Diane D. Mizrahi
(74) *Attorney, Agent, or Firm*—Sawyer Law Group LLP

(57) ABSTRACT

Aspects for efficient archiving and dearchiving for a digital media distributor are presented. The aspects include a tape library for storing archived storage items, an archive server coupled to and managing the tape library, and a central site server coupled to the archive server and including a stage manager component. The stage manager component performs an archive operation to the archive server in response to a store request by grouping storage items according to predefined group categories and performs a dearchive operation from the archive server in response to a retrieve request by sorting storage items according to storage order within the predefined group categories.

20 Claims, 3 Drawing Sheets

METHOD AND SYSTEM FOR EFFICIENT FILE ARCHIVING AND DEARCHIVING IN A DMD SYSTEM

RELATED APPLICATIONS

The present invention is related to U.S. Application, entitled MULTIMEDIA INFORMATION COMPUTER SYSTEM AND METHOD OF OPERATION OF A PLAYLIST SCHEDULER, Ser. No. 09/420,802, filed on Oct. 19, 1999, and assigned to the assignee of the present invention.

FIELD OF THE INVENTION

The present invention relates to digital media distribution, and more particularly to efficient archiving and dearchiving in a digital media distributor (DMD) system.

BACKGROUND OF THE INVENTION

Although broadcasters have sophisticated systems for inserting national commercials into a program stream, including integrated traffic and billing systems, there are numerous obstacles to implementing a system to insert local commercials at small markets into a national program feed distributed by satellite. Until now, such local spot insertion advertising was the responsibility of the local broadcaster or cable operator.

Inserting local advertising poses several nontrivial technical, logistical and business challenges. First, literally hundreds of widely distributed local operators (or affiliates) would need to receive the commercials; ad agencies would have to ship analog tapes to hundreds of organizations, with different traffic and billing systems. These tapes would need to be tested for quality assurance, tracked, and stored until needed. They would then have to be distributed to video tape recorders and readied for computer controlled playout (analog) at the proper time, 24 hours a day, seven days a week. Such infrastructure generally exists at well-funded affiliates in major markets but is nonexistent and prohibitively expensive for smaller operators or affiliates in small markets.

Managing such tapes with ads for local commercials and inserting them properly into the program feed is a complex undertaking not well-suited for the smaller operators, especially for channels with smaller audiences in smaller markets. A quality broadcast involves more than excellent program material; it must provide seamless insertion of national and local advertisements, promotions, and station identifications.

Equally important is the ability to maintain the integrity of the national television programming. Centralized control of the channel's programming (playout) is required to prevent local affiliates from tampering with the programming.

A need exists for a digital media distributor system with efficient archiving and dearchiving. The present invention addresses such a need.

SUMMARY OF THE INVENTION

Aspects for efficient archiving and dearchiving for a digital media distributor are presented. The aspects include a tape library for storing archived storage items, an archive server coupled to and managing the tape library, and a central site server coupled to the archive server and including a stage manager component. The stage manager component performs an archive operation to the archive server in response to a store request by grouping storage items according to predefined group categories and performs a dearchive operation from the archive server in response to a retrieve request by sorting storage items according to storage order within the predefined group categories.

Through the present invention, an approach to archiving/dearchiving spot files to/from a tape library is provided that achieves high speed and thus better efficiency for a digital media distributor system. The approach utilizes the storage of objects which pertain to a single group, i.e., a single group of affiliates, on a single tape. Further, when objects are retrieved from tape, objects which belong to a single group are bundled into a single request, such that multiple reads can be done on a single tape in a highly efficient manner (i.e., without moving the tape arms unnecessarily). These and other advantages of the present invention will be more fully understood in conjunction with the following detailed description and accompanying drawings.

DETAILED DESCRIPTION

The present invention relates to efficient archiving and dearchiving in a digital media distributor system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

In accordance with the present invention, a digital media distributor (DMD) provides a complete end-to-end system that gives local cable or network affiliates the ability to provide local ads and announcement insertion together with the delivery of cable or network feed(s). In general, the DMD integrates the entire process of sales, traffic, digital encoding and storage of spots, transmission of data, local insertion of digital ads and announcements, account reconciliation, and billing. Spots (i.e., media such as commercials, station identification, public service announcements, etc.) are digitized by the cable or network operator, and then digitally transmitted to the local cable head-ends or network affiliates from a central site. These digital spots are then stored on the remote site servers located at each head-end or affiliate.

Figure 1:
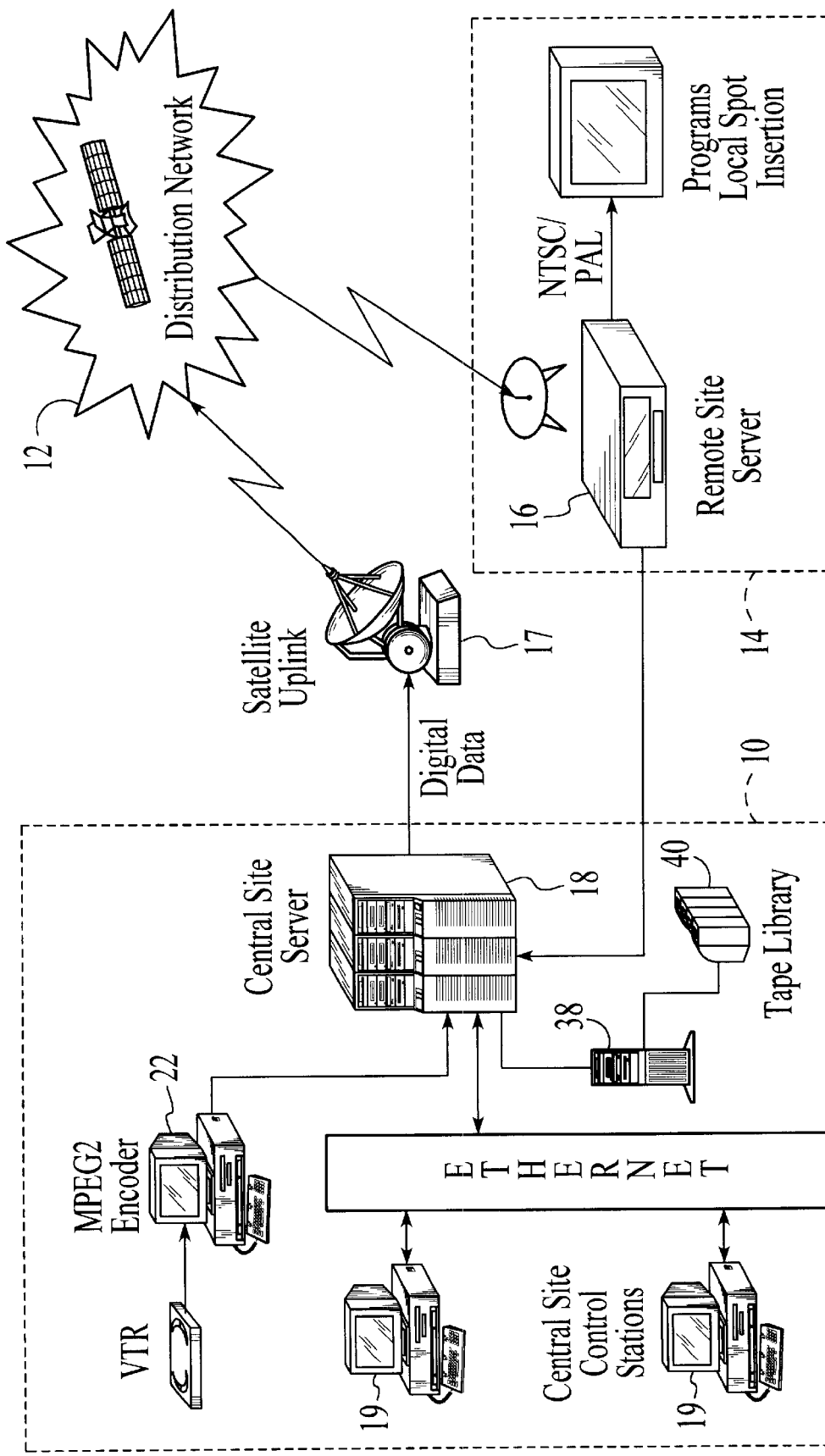
FIG. 1 illustrates a block diagram of a digital media distribution system in accordance with the present invention.

A block diagram of a DMD in accordance with the present invention is illustrated in FIG. 1. As shown, the DMD includes three major components: a central site 10, a distribution network 12, and a remote site 14. The central site 10 is the location for the digital encoding of MPEG-2 files from source video tapes, storage and management of digital files, management of remote site(s) 14, and distribution of schedules and MPEG-2 files. Thus, the processing, analysis, distribution, and management of data occurs at the central site 10. The distribution network 12 is the mechanism by which the remote site(s) 14 receive program streams and digital spots. The data distribution is accomplished via various methods, such as a satellite and/or land-based distribution. The broadcaster may choose to have the program stream sent via terrestrial links (e.g., token ring, ethernet, etc.), while the spot insertion is sent via satellites or vice versa.

The remote site(s) 14 house the remote site server(s) 16. By way of example, a suitable remote site server 16 includes a Pentium processor-based device with a hard disk for local storage and a video switch card (to switch between program and commercial insertion) running software including Windows NT, DMD programming, Lotus Notes client, Program Loader, and Symantec pcANYWHERE. These unattended, computerized systems receive the local spot insertion and provide As-Run file generation. The remote site server 16 is a video server that receives and stores digitized spots utilized for local insertion at the cable head-end. The remote site server 16 receives digitally encoded ads via satellite or other distribution network. These spots are decoded to an analog signal and inserted into the cable or network operator feed at scheduled times, i.e., into scheduled local availability times. The remote site server 16 can be customized in various configurations based on the number of output channels required, the type of output format (e.g., NTSC, PAL), the amount of local storage required (i.e., the number of spots on disk), the type of network (satellite or terrestrial), the type of trigger for spot insertion (e.g. time of day, VITC, cue-tome, VBI trigger), the audio format and connections (stereo, mini-XLR or XLR), the redundancy requirements (RAID, mirrored disks), and the preview channel.

By way of example, the following provides a sample process that illustrates an example of one process which the DMD solution can support. A region, e.g., any grouping of one ore many cable head-ends for cities, states, provinces, or countries, defined by cable or network operators in an area, sells a commercial in the local availability time. All remote site servers 16 within the same region play the same material at the same time, including all network programs, national spots, local commercials, announcements, etc. The video-taped segment for the commercial is digitally encoded. The digital material is scheduled for delivery to each remote site server 16 prior to broadcast. The playlist, digitized spots, and the broadcast program stream are sent, via satellite, to all of the remote site servers 16 within the region. All of the remote site servers 16 within the region air the local spots for that region at the scheduled time. As-Run logs are retrieved by the central site 10 from the remote site servers 16. As-Run logs are sent to the local markets, reviewed, reconciled, and customers are billed. Commercials and As-Run logs are archived.

A main component in the central site 10 is the central site server 18. By way of example, a suitable central site server 18 includes an IBM RS/6000 F50 dual CPU system, or a Pentium II compatible PC, running the IBM UNIX operating system, AIX, DB2 server software, Lotus Notes server software, ADSM, Windows NT (for PC-based central site server), and the DMD programming. Suitable components for the control workstations 19 include Pentium compatible PCs running Windows NT, Lotus Notes client, DB2 client, Microsoft Internet Explorer, and DMD programming.

Figure 2:
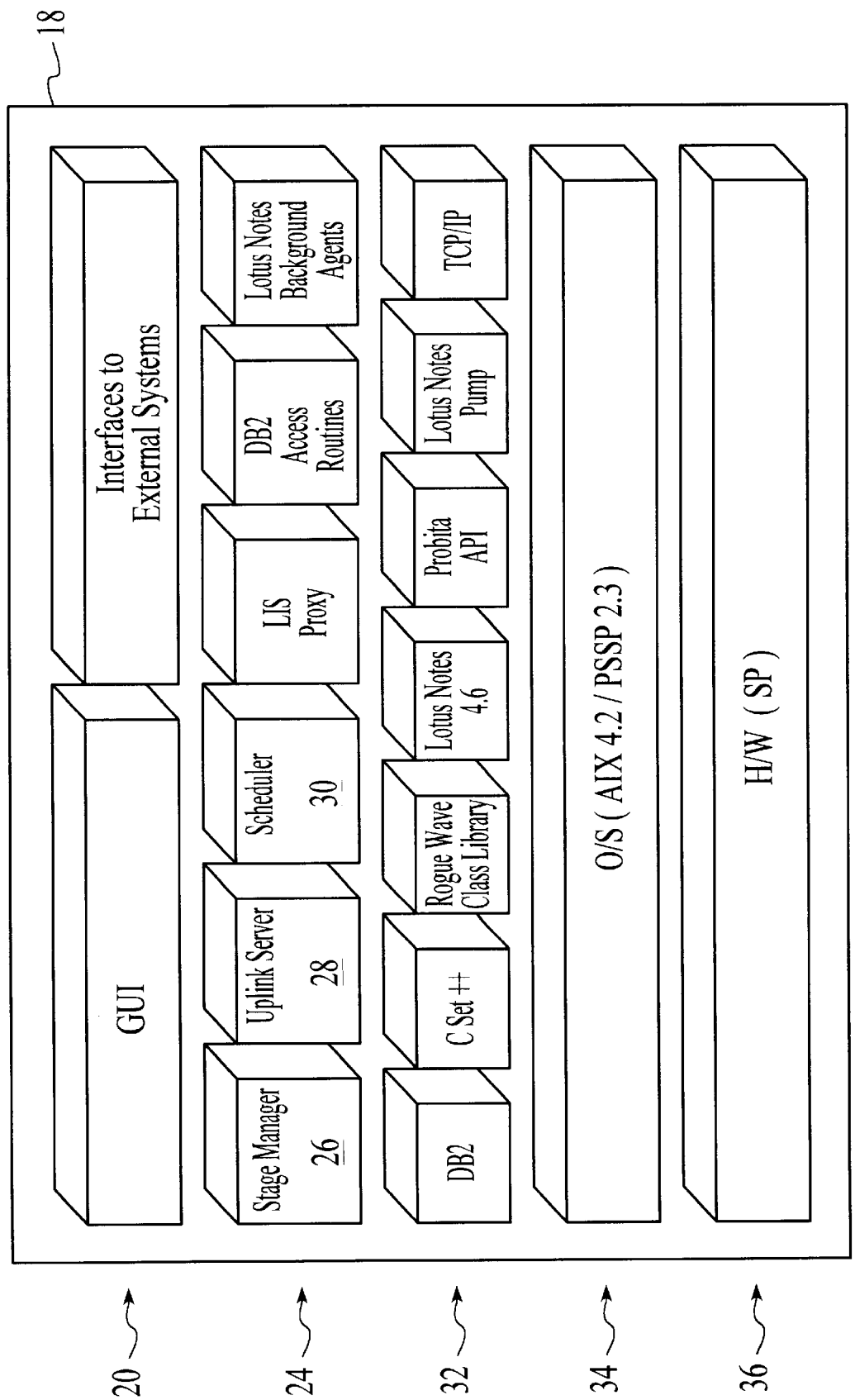
FIG. 2 illustrates an example of a suitable layered architecture for the central site server.

The central site server 18 includes software on a suitable computer readable medium that is architected using a layered model, in which each layer isolates the upper layers from the details of the lower layers and individual components within a layer provide a unique set of services, as is well appreciated by those skilled in the art. FIG. 2 illustrates an example of a suitable layered architecture for the central site server 18. The top layer 20 addresses the external interfaces of the central site server 18, including a graphical user-interface (GUI) component and the interfaces to the external systems. The GUI component, e.g., using Lotus Notes, provides administrators and operators with the ability to monitor and control the DMD. In accordance with the present invention, the interfaces to external systems include interfaces to traffic systems, interfaces to stations in a box (SIBs) which send Lotus Notes messages, and interfaces to encoder systems (22, FIG. 1), which store encoded spot files in a disk pool server for retrieval by the central site server 18.

Underneath the top layer is a layer 24 of specialized components including a stage manager component 26, an uplink server component 28, and a transmission scheduler component 30. This layer 24 may also include specialized components for creating commands and interpreting responses from SIBs, managing access to all the database queues and other data stores, and providing automated agents that run based on time or events to manage the external interfaces, e.g., processing files received from traffic systems. The stage manager 26 manages any tape-related activity, the uplink server 28 manages transmissions through the uplink network (12, FIG. 1), and the transmission scheduler manages scheduling tasks. Also included as a next layer is a programming layer 32. The layer 32 includes the programming libraries and APIs (application programming interfaces) that are used to build the specialized components. The lower two layers include an operating system layer 34 and a hardware layer 36 for the fundamental operation of the central site server 18, as is well appreciated by those skilled in the art.

A high node of the central site server 18 is used for an archive server 38 for a tape library system 40 (FIG. 1). The tape library system 40 is directly connected via multiple SCSI channels, and is configured, for example, as an IBM 3494 tape library dataserver with six Magstar 3590 tape drives and 835 slots, with each tape cartridge capable of storing about 10 GB (gigabytes) of uncompressed data or about 30 GB of compressed data, and a storage capacity of about 8350 GB if every slot is used. A suitable configuration for the archive server 38 includes two PowerPC 604e CPUs with 25 MB (megabyte) SDRAM and appropriate adapters.

Figure 3:
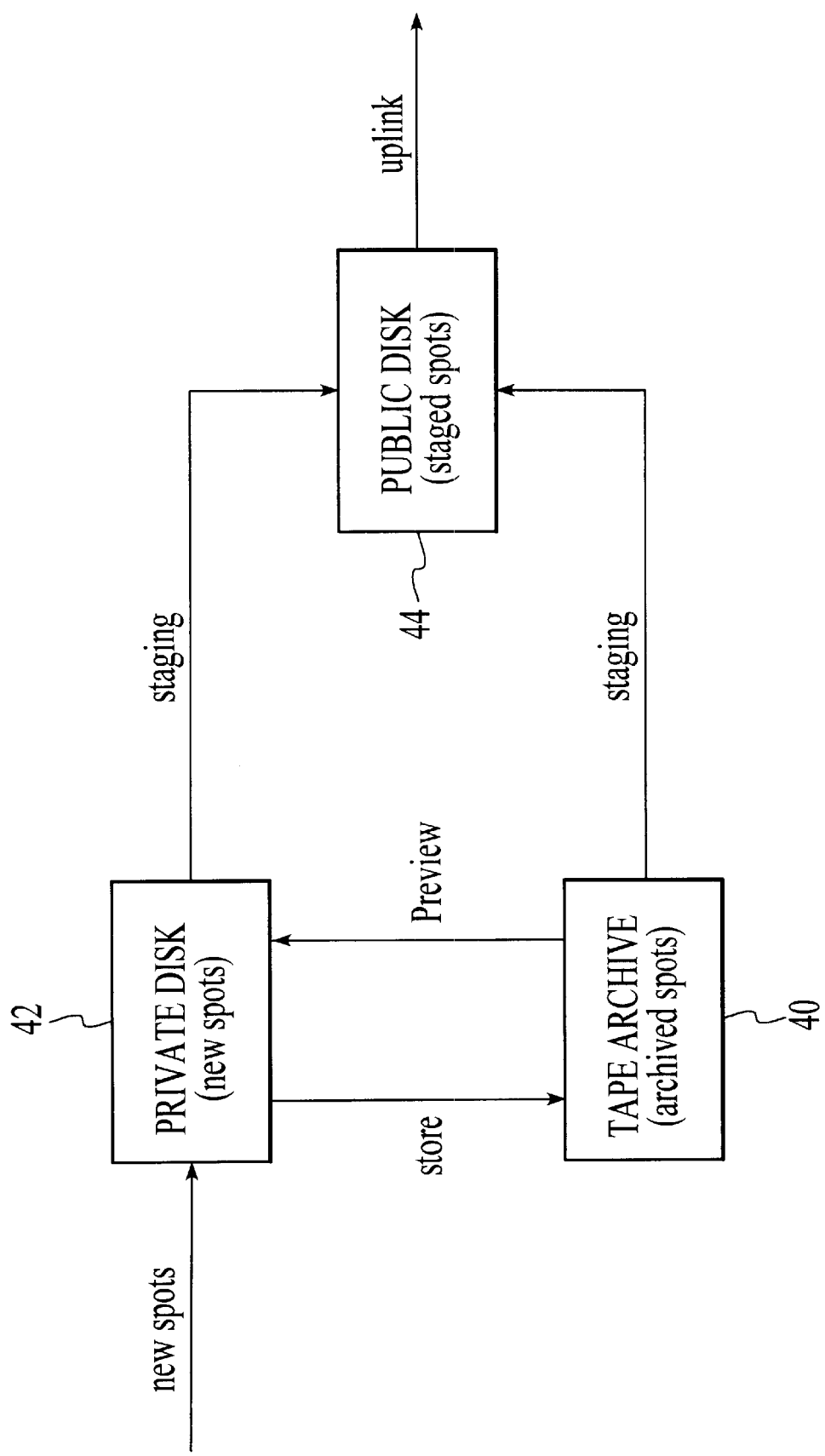
FIG. 3 illustrates a block diagram of resource interaction for tasks of a stage manager of the central site server.

The stage manager 26 manages the tape library system 40 for any tape related activity. Thus, the stage manager 26 is responsible for managing spot storage and retrieval, interfacing to the archive server 38 to store, retrieve, and purge spots, and managing local disk resources for temporary storage of spots. In performing the management, the stage manager 26 owns a PRIVATE disk area 42 (i.e., an area that only the stage manager 26 knows of and operates in) of about 27 GB mirrored disk space contained in one AIX file system for use in storing new spots and spots for preview and also owns a PUBLIC disk area 44 of about 117 GB mirrored disk space partitioned into two AIX file systems of equal size for exclusive use in staging uplink spots, as shown in FIG. 3. FIG. 3 further illustrates the tasks supported by the resources 40, 42, and 44.

The stage manager 26 manages tape related activity by performing stage, purge, store, delete, preview, previewpurge, and replace tasks. The stage task refers to staging spots scheduled for uplink transmission. Purge refers to purging spots that are no longer needed from the PUBLIC disk area 42, while the original spot is still available from the tape library system 40 for future staging. The store task refers to archiving new spots transmitted from the spot encoding area. Delete refers to deleting spots from the central site server 18, making the spot no longer available for staging. Preview provides spot staging for a representative's viewing of the spot, while previewpurge provides purging of spots that have been transferred to the representative's workstation. The replace task provides a combination of the delete and purge tasks.

The archiving of new spots improves tape performance in accordance with the present invention by storing all new spots on the PRIVATE disk area 42 and processing the new spots in batches according to predefined categories, e.g., DMA, where a DMA refers to the group or unit in the local area that will receive and broadcast program material and perform ad insertion. A process external to the stage manager 26 transfers the encoded spot to the PRIVATE disk area 42 and posts a store request in a request queue for the stage manager 26. The stage manager 26 processes each store request in two passes.

During the first pass, upon receiving the store request, the stage manager 26 adds a record to a spot reservation table and checks that the spot is indeed on the PRIVATE disk area 42 and has the correct size. If the spot is not on the PRIVATE disk area 42 or the size is incorrect, the stage manager 26 returns an error. If this is a new spot, the stage manager 26 acknowledges the arrival of a new spot by updating a current status field in a spot inventory database table from a status of 'encoding' to 'on server/archived.' If this is an overwriting spot, (i.e., the current status field already has a status of 'on server/archived'), the stage manager 26 deletes the spot, if present, from the tape library system 40. If the old version of the spot is found on the PRIVATE disk area 42, the spot would be replaced. If this is an overwriting spot and the spot is also staged, the version staged on the PUBLIC area 44 needs to be refreshed with the new version on the PRIVATE disk area 42. As an overwrite process, the new version is written on top of the old version. Any difference in size between the new and old versions causes an update to a disk space usage database table. An entry is logged in a new spot inventory table with a 'waiting' status, and the record is removed from a spot reservation database. The transmission scheduler 30 (FIG. 2) is then informed of the presence of a new spot.

The second pass for a store request, internal to the stage manager 26, is to archive the new spots to tape. Accordingly, an entry is made to a last update database table to indicate archiving has been started for the day. Stage manager 26 performs several tasks for every entry logged in the new spot inventory table. The tasks include grouping and archiving all new spots by a predefined group category, i.e., by DMA. Preferably, the DMA with the largest number of new spots to be archived is processed first. A record is added to the spot reservation database for each spot in the DMA. An update to the new spot inventory table is made, so that the status is 'storing'. An interface is constructed with the archive server 38, and the spots are archived to the archive server 38. Spots successfully archived are then deleted from the PRIVATE disk area 42. The entries for the spots are deleted from the new spot inventory table, and the records from the spot reservation database are removed for each spot previously reserved.

For performance reasons, preferably the second pass is run once a day. However, to ensure that the PRIVATE disk area 42 does not run out of space for new spots, the second pass is started when the total number of new spots exceeds a chosen threshold, (e.g., 500) and the processing is stopped when the total number of new spots, drops below another threshold (e.g., 400).

For the dearchiving of spots from the tape library system 40, since the spots are grouped by DMA, the requests to retrieve spots are sorted by the order in which the spots are stored. For example, an order of stored spots for a DMA may be spot5, spot1, spot3, and spot10. If a retrieve request is made for spot1, spot10, spot3, the order of retrieval is spot1, spot3, spot10. A main step for a dearchive request includes a database access to get a stage request bundle and submission of the dearchive request to the archive server 38. The mount, seek, read, network transport, and write to disk operations then follow for each spot in the bundle. With stage requests which belong to a single group bundled into a single request, multiple reads can be done on a single tape in a highly efficient manner (i.e., without moving the tape arms unnecessarily).

In handling tasks associated with the archive server 38, the stage manager 26 acts as a client to the archive server 38, which responds to store, retrieve, and delete requests from the stage manager 26. The archive server 38 is preferably based upon the IBM ADSM program product, which proves a wide range of storage management capabilities to backup/archive/restore/retrieve spots (files). Of course, other programs that provide equivalent functionalities and capabilities may be used, if desired. The tape collocation feature of ADSM is used to minimize the number of tape mounts. An archive diskpool is used to improve performance when new spots are added daily. The tape reclamation feature is used to automatically manage obsolete spots. The archive server 38 further owns and manages individual files, clients do not, so that clients do not (and do not need to) know which files are on which tapes. The archive server 38 also owns and manages allocated tape drives and disk space, clients do not. For example, clients cannot issue a command to mount a particular tape on a particular drive. Rather, clients issue a command to retrieve a file or restore a group of files. It is up to the archive server 38 to locate the tapes and available drives and then complete the request.

In accordance with the present invention, the archive server 38 is configured to perform the following tasks: daily pushes of archived spots from archive diskpool to archive tapepool; daily copies of the primary pool to a copypool; daily backups of the ADSM database and critical files for recovery; daily running of Inventory Expiration (the side effect of this command is to reclaim tapes if they meet reclamation criteria, with tape reclamation requiring at least two drives); and deleting spots after running Inventory Expiration.

When collocation is enabled, the archive server 38 attempts to select a volume that already contains spots from the current DMA. When the archive server 38 needs to continue to store data on a second volume, the archive server 38 acquires additional space according to a selection order that starts with an empty predefined volume, then an empty scratch volume, followed by a volume with the most available free space, and finally any available volume in the storage pool. Through this selection process, the archive server 38 attempts to provide the best use of individual volumes without mixing spots on multiple volumes. However, the archive server 38 substantially guarantees collocation only if there are enough scratch volumes at the tape server's disposal. If the archive server 38 runs out of scratch volumes, spots from different DMAs can be stored on the same volume, but this will degrade performance and preferably is avoided.

Through the present invention, an approach to archiving/dearchiving spot files to/from a tape library is provided that achieves high speed and thus better efficiency for a digital media distributor system. The approach utilizes the storage of objects which pertain to a single group, i.e., a single group of affiliates, on a single tape. Further, when objects are retrieved from tape, objects which belong to a single group are bundled into a single request, such that multiple reads can be done on a single tape in a highly efficient manner (i.e., without moving the tape arms unnecessarily).

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for achieving efficient archiving and dearchiving in a digital media distributor system, the method comprising:

performing an archive operation to a tape server in response to a store request by grouping storage items according to predefined group categories; and performing a dearchive operation from the tape server in response to a retrieve request by sorting storage items according to storage order within the predefined group categories.

2. The method of claim 1 wherein storage items further comprise digital spots.

3. The method of claim 2 wherein the predefined group categories further comprise groups of affiliates.

4. The method of claim 1 wherein the steps of performing an archive operation and a dearchive operation occur with a stage manager component of the digital media distributor system.

5. The method of claim 4 wherein performing an archive operation occurs during a second pass by the stage manager in processing the store request.

6. The method of claim 4 further comprising utilizing a private disk area for storing the storage items for grouping.

7. The method of claim 4 wherein performing an archive operation further comprises processing a predefined group category with a largest number of storage items to be archived first.

8. An efficient archiving and dearchiving system supporting digital media distribution, the system comprising:

a tape library for storing archived storage items;

an archive server coupled to and managing the tape library; and a central site server coupled to the archive server and including a stage manager component, the stage manager component performing an archive operation to the archive server in response to a store request by grouping storage items according to predefined group categories; and performing a dearchive operation from the archive server in response to a retrieve request by sorting storage items according to storage order within the predefined group categories.

9. The system of claim 8 wherein the storage items further comprise digital spots.

10. The system of claim 9 wherein the predefined group categories further comprise groups of affiliates.

11. The system of claim 8 wherein the stage manager component acts as a client to the archive server.

12. The system of claim 8 wherein the stage manager component performs the archive operation during a second pass in processing the store request.

13. The system of claim 8 wherein the stage manager component further utilizes a private disk area for storing the storage items for grouping.

14. The system of claim 8 wherein the stage manager component further processes a predefined group category with a largest number of storage items to be archived first.

15. A method for performing efficient archiving and dearchiving of digital spots in a digital media distributor system, the method comprising:

(a) storing spots on a private disk area;

(b) processing the spots in batches according to predefined group categories;

(c) archiving the spots according to the predefined group categories; and (d) utilizing the predefined group categories for efficient spot retrieval in a dearchive operation.

16. The method of claim 15 further comprising utilizing a stage manager component to perform steps (a), (b), (c), and (d).

17. The method of claim 16 further comprising utilizing the stage manager component to perform purge, delete, preview, and replace tasks.

18. The method of claim 16 further comprising utilizing the stage manager component as a client to an archive server.

19. The method of claim 18 further comprising utilizing the archive server to perform daily maintenance of archived spots.

20. The method of claim 15 wherein the predefined group categories comprise groups of affiliates.

* * * * *